United States Patent
McGrogan

(10) Patent No.: US 7,222,117 B1
(45) Date of Patent: May 22, 2007

(54) SEGMENTED GLOBAL AREA DATABASE

(75) Inventor: Stephen K. McGrogan, Pleasanton, CA (US)

(73) Assignee: Advent Software, Inc., San Francisco, CA (US)

( * ) Notice: Subject to any disclaimer, the term of this patent is extended or adjusted under 35 U.S.C. 154(b) by 502 days.

(21) Appl. No.: 10/713,650

(22) Filed: Nov. 14, 2003

(51) Int. Cl.
*G06F 17/30* (2006.01)

(52) U.S. Cl. ............................ 707/3; 707/2; 707/103 R

(58) Field of Classification Search ............... 707/1, 707/2, 100, 3, 104.1, 103, 200
See application file for complete search history.

(56) References Cited

U.S. PATENT DOCUMENTS

| | | | |
|---|---|---|---|
| 4,805,134 A | 2/1989 | Calo et al. |
| 4,853,842 A | 8/1989 | Thatte et al. |
| 4,972,367 A | 11/1990 | Burke |
| 5,008,786 A | 4/1991 | Thatte |
| 5,010,478 A | 4/1991 | Deran |
| 5,043,885 A | 8/1991 | Robinson |
| 5,136,707 A | 8/1992 | Block et al. |
| 5,202,985 A | 4/1993 | Goyal |
| 5,237,661 A | 8/1993 | Kawamura et al. |
| 5,276,835 A | 1/1994 | Mohan et al. |
| 5,283,884 A | 2/1994 | Menon et al. |
| 5,283,894 A | 2/1994 | Deran |
| 5,305,389 A | 4/1994 | Palmer |
| 5,398,336 A | 3/1995 | Tantry et al. |
| 5,404,477 A | 4/1995 | Jippo |
| 5,408,653 A | 4/1995 | Josten et al. |
| 5,412,805 A | 5/1995 | Jordan, II et al. |
| 5,426,747 A | 6/1995 | Weinreb et al. |
| 5,428,761 A | 6/1995 | Herlihy et al. |
| 5,434,992 A | 7/1995 | Mattson |
| 5,437,027 A | 7/1995 | Bannon et al. |
| 5,455,942 A | 10/1995 | Mohan et al. |
| 5,465,352 A | 11/1995 | Nakazawa et al. |

(Continued)

OTHER PUBLICATIONS

Kinsley, K.C. and Hughes, C.E., Analysis of a Virtual Memory Model for Maintaining Database Views, IEEE Transactions on Software Engineering, May 1992, pp. 402-409, vol. 18, Issue 5.

(Continued)

*Primary Examiner*—Tim Vo
*Assistant Examiner*—Dangelino Gortayo
(74) *Attorney, Agent, or Firm*—Stephen C. Glacier; Kirkpatrick & Lockhart Preston Gates Ellis LLP

(57) ABSTRACT

Embodiments of the present invention relate to memory management methods and systems for object-oriented databases (OODB). In an embodiment, a database includes a plurality of memory-mapped file segments stored on at least one nonvolatile memory medium and not in main memory. An application program connects to the database. A fault handler associated with the database is registered with the operating system of the application program. The fault handler catches a segmentation fault that is issued for an object referenced by the application program and resident in the database. A file segment corresponding to the referenced object is found and mapped into main memory. The application program is restarted. Because data is transparently mapped into and out of the main memory without copying the data, objects may be read with near zero latency, and size restrictions on the database may be eliminated.

34 Claims, 9 Drawing Sheets

U.S. PATENT DOCUMENTS

| | | | |
|---|---|---|---|
| 5,485,609 | A | 1/1996 | Vitter et al. |
| 5,493,668 | A | 2/1996 | Elko et al. |
| 5,499,367 | A | 3/1996 | Bamford et al. |
| 5,506,984 | A | 4/1996 | Miller |
| 5,550,971 | A | 8/1996 | Brunner et al. |
| 5,560,006 | A | 9/1996 | Layden et al. |
| 5,561,795 | A | 10/1996 | Sarkar |
| 5,574,902 | A | 11/1996 | Josten et al. |
| 5,608,904 | A | 3/1997 | Chaudhuri et al. |
| 5,611,076 | A | 3/1997 | Durflinger et al. |
| 5,615,360 | A | 3/1997 | Bezek et al. |
| 5,636,350 | A | 6/1997 | Eick et al. |
| 5,649,139 | A | 7/1997 | Weinreb et al. |
| 5,668,987 | A | 9/1997 | Schneider |
| 5,680,573 | A | 10/1997 | Rubin et al. |
| 5,682,527 | A | 10/1997 | Cooper et al. |
| 5,701,461 | A | 12/1997 | Dalal et al. |
| 5,706,506 | A | 1/1998 | Jensen et al. |
| 5,727,203 | A | 3/1998 | Hapner et al. |
| 5,745,904 | A | 4/1998 | King et al. |
| 5,758,149 | A | 5/1998 | Bierma et al. |
| 5,787,471 | A | 7/1998 | Inoue et al. |
| 5,805,809 | A | 9/1998 | Singh et al. |
| 5,812,996 | A | 9/1998 | Rubin et al. |
| 5,822,749 | A | 10/1998 | Agarwal |
| 5,826,253 | A | 10/1998 | Bredenberg |
| 5,832,521 | A | 11/1998 | Klots et al. |
| 5,835,908 | A | 11/1998 | Bennett et al. |
| 5,835,959 | A | 11/1998 | McCool et al. |
| 5,864,849 | A | 1/1999 | Bohannon et al. |
| 5,897,634 | A | 4/1999 | Attaluri et al. |
| 5,915,249 | A | 6/1999 | Spencer |
| 5,933,593 | A | 8/1999 | Arun et al. |
| 5,963,937 | A | 10/1999 | Yamasaki et al. |
| 6,009,271 | A | 12/1999 | Whatley |
| 6,014,673 | A | 1/2000 | Davis et al. |
| 6,070,165 | A | 5/2000 | Whitmore |
| 6,081,875 | A | 6/2000 | Clifton et al. |
| 6,173,292 | B1 | 1/2001 | Barber et al. |
| 6,314,417 | B1 | 11/2001 | Bennett et al. |
| 6,321,235 | B1 | 11/2001 | Bird |
| 6,330,565 | B1 | 12/2001 | Nesbitt |
| 6,446,062 | B1 | 9/2002 | Levine et al. |
| 6,457,021 | B1 * | 9/2002 | Berkowitz et al. .......... 707/201 |
| 6,496,831 | B1 * | 12/2002 | Baulier et al. ............... 707/101 |
| 6,507,847 | B1 | 1/2003 | Fleischman |
| 6,564,215 | B1 * | 5/2003 | Hsiao et al. ................... 707/8 |
| 6,591,266 | B1 | 7/2003 | Li et al. |
| 6,598,119 | B2 | 7/2003 | Becker et al. |
| 6,609,126 | B1 | 8/2003 | Smith et al. |
| 6,865,658 | B2 * | 3/2005 | Tomori et al. ............... 711/173 |
| 6,874,001 | B2 * | 3/2005 | Narang et al. ............... 707/203 |
| 6,957,237 | B1 * | 10/2005 | Traversat et al. ........... 707/206 |
| 6,970,872 | B1 * | 11/2005 | Chandrasekaran et al. .... 707/10 |
| 2001/0049685 | A1 | 12/2001 | Carey et al. |
| 2002/0026448 | A1 | 2/2002 | Bird et al. |
| 2002/0087500 | A1 | 7/2002 | Berkowitz et al. |
| 2003/0120638 | A1 | 6/2003 | Park et al. |
| 2003/0187851 | A1 | 10/2003 | Fay et al. |
| 2003/0204504 | A1 | 10/2003 | Stuy et al. |
| 2003/0221068 | A1 | 11/2003 | Tsuji et al. |
| 2003/0225662 | A1 * | 12/2003 | Horan et al. .................. 705/36 |
| 2003/0229650 | A1 | 12/2003 | Olstad et al. |

OTHER PUBLICATIONS

Birrell, A., Jones, M. Wobber, E., A Simple and Efficient Implementation of a Small Database, ACM Symposium on Operating Systems Principles archive, 1987, pp. 149-154.

Traiger, Irving L., Virtual Memory Management for Database Systems, ACM SIGOPS Operating Systems Review archive, 1982, pp. 26-48, vol. 16, Issue 4, ACM Press, New York, NY.

Ji, Minwen, Affinity-based Management of Main Memory Database Clusters, ACM Transactions on Internet Technology (TOIT) archive, 2002, pp. 307-339, vol. 2, Issue 4.

Dionn, IronEye Cache—Default branch, Freshmeat.net, May 30, 2003 12:08PST.

Hoverd, Tim, Liverstore—Default branch, Freshmeat.net, Oct. 23, 2002 10:22 PST.

No author listed, twz1jdbcForMysql—Default branch, Freshmeat.net, Aug. 1, 1998 22:04 PST.

Darling, Aaron, mpiBLAST—Default branch, Freshmeat.net, Feb. 11, 2003 19:55 PST.

* cited by examiner

SEGMENTED GLOBAL AREA DATABASE

BACKGROUND

1. Field

Embodiments of the present invention relate generally to object-oriented databases (OODBs). More specifically, embodiments relate to memory management methods and systems in such databases.

2. Description of Related Art

In the information age, databases are a precious commodity, storing immense quantities of data for use in various applications. Latency, or time needed to access stored database data, is a crucial metric for many performance-intensive applications. Portfolio management applications, for example, are generally performance-intensive.

In-memory databases are the fastest possible databases. In such databases, which place the dataset in main memory, any piece of information is available with almost zero latency. The memory requirements of such databases increase with the size of the stored dataset. Therefore, such databases become excessively expensive from a hardware perspective when datasets are very large. In addition, computer manufacturers limit the amount of memory that can be installed in their machines, which limits the maximum size of the dataset that can be stored.

Some database systems address this memory problem by using software to cache portions of the dataset in main memory while keeping the majority in secondary memory (i.e., secondary storage), such as on disk. While this approach solves one problem, it creates another: Complex software must keep track of the location of the objects being stored, moving copies of the in-memory objects back and forth from the disk. This approach also increases complexity and latency, as software must determine where to look for the object—in memory or on disk. In addition, desired data must be copied to the application's memory space because, for data integrity and functional reasons, users cannot be allowed direct access to the database copy of the object, whether it is found in the memory cache or on the disk.

SUMMARY

Embodiments of the present invention relate to database systems and methods.

In an embodiment, for the first time, data of a database is stored exclusively in secondary storage of a computer, not in main memory in the CPU. Instead, data is transparently mapped into and out of the main memory—not copied into the main memory—in response to reference patterns of an application program. Because with mapping, the data can be directly accessed by an application program at speeds close to those achievable if the data resided in the memory space of the application program, no copying of data need occur between secondary storage and main memory. As such, objects can be read by applications directly out of secondary storage with near zero latency, and without the database size restrictions of existing systems that copy database data into main memory.

In an embodiment, memory interrupt and virtual memory mapping facilities of computer hardware may be employed to make data appear to be in main memory when it actually resides in disk files on disk. That is, data can be accessed by applications directly out of secondary storage at speeds closely approximating existing systems that copy data into main CPU memory. No complex software is required to determine the residency of the data objects. The database may have an associated small fault or interrupt handler. If an object referenced by an application is not currently mapped into memory, the computer hardware, not software, will detect the fault. Then, the fault handler of the present invention will transparently map the appropriate disk file address into memory. Since the manufacturers of modern computers rely on virtual mapping hardware and page swapping for overall machine speed, use of such facilities to map database data results in the fastest possible performance for the application.

Embodiments herein can greatly reduce the amount of database data that needs to reside in main CPU memory at any one moment. Accordingly, embodiments enable scalability to far larger datasets in secondary storage than previously possible, as well as the use of smaller, less expensive systems to perform current processing requirements. TCO (Total Cost of Ownership) is thus reduced. Database startup time is also greatly reduced, for data is placed in main memory only as needed, rather than loading all the data into memory before any processing can occur. Users also can reliably log into the database system even during periods of high volume transaction loading.

Embodiments herein may be used in connection with applications that interact with databases, such as investment portfolio management applications, for example.

In an embodiment, a database may be structured as a plurality of memory-mapped file segments stored on at least one nonvolatile memory medium. The file segments may include objects that are directly interconnected by memory pointers into one large matrix of information.

DETAILED DESCRIPTION

The following description refers to the accompanying drawings that illustrate certain embodiments of the present invention. Other embodiments are possible and modifications may be made to the embodiments without departing from the spirit and scope of the invention. Therefore, the following detailed description is not meant to limit the present invention. Rather, the scope of the present invention is defined by the appended claims.

Embodiments of the present invention relate to memory management methods and systems for databases, such as object-oriented databases (OODB).

In an embodiment, a database data repository includes a plurality of memory-mapped file segments stored on at least one nonvolatile memory medium. An application program connects to the data repository. A fault handler associated with the data repository is registered with the operating system of the application program. The fault handler catches a segmentation fault that is issued for an object referenced by the application program and resident in the data repository. A file segment corresponding to the referenced object is found and mapped into main memory. The application program is restarted at the interrupt location at which the segmentation fault was issued. Because data is transparently mapped into and out of the main memory without copying the data, objects may be read with near zero latency, and size restrictions on the database may be eliminated.

Although various embodiments herein are discussed in connection with portfolio management systems, it is to be appreciated that the present teachings may be implemented in any context which utilizes databases, such as, for example, a trade order management system (TOMS) or partnership accounting system.

Various embodiments herein have been implemented by Advent Software, Inc. (San Francisco, Calif.) as the Geneva Segmented Advent Global Area (SAGA). Geneva is a portfolio management system that is used by institutions involved in the trading of investments.

Figure 1:
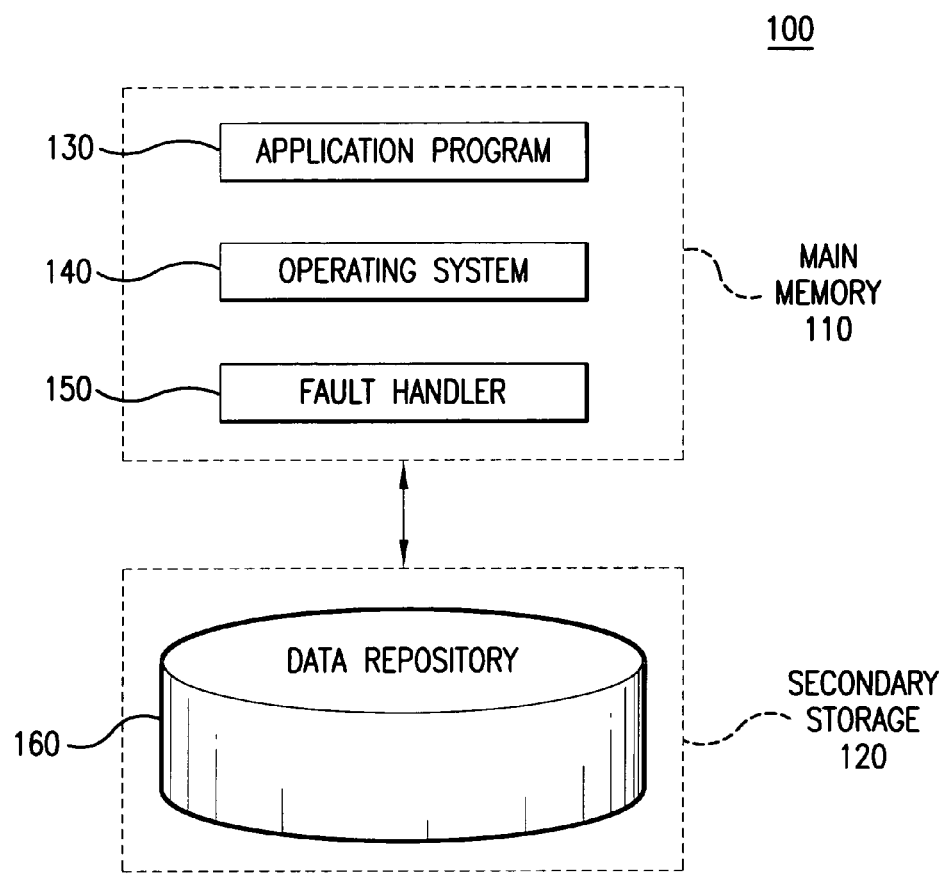
FIG. 1 shows a hardware and software schema according to an embodiment of the present invention.

FIG. 1 shows a hardware and software schema 100 according to an embodiment of the present invention. The schema 100 includes a main memory 110 and secondary storage 120. Resident in the main memory 110 is an application program 130, an operating system 140, and a fault handler 150. The secondary storage 120 includes a data repository 160.

The application program 130 is programmed to access the data repository 160. The fault handler 150 is associated with the data repository 160 and registered with the operating system 140. In an embodiment, the fault handler 150 is not native to the operating system 140, which may include its own fault handlers. Instead, the fault handler 150 is written particularly to enable interactions between the application program 130 and the data repository 160.

In an embodiment, the data repository 160 includes various file segments. At any one time, some file segments are mapped into the main memory 110, and other segments are not.

In an embodiment, when the application program 130 references an object that resides in the data repository 160, but is not currently mapped into the main memory 110, a segmentation fault is issued by the computer hardware at an interrupt location in the application program 130. The fault handler 150 is able to catch the segmentation fault. The fault handler 150 then finds a file segment of the data repository 160 that corresponds to the referenced object. That file segment is mapped into the main memory 110, and the application program 130 is restarted at the interrupt location.

In an embodiment, various software components of the schema 100 may be written in an object-oriented programming language, such as C++ or another such language.

Figure 2:
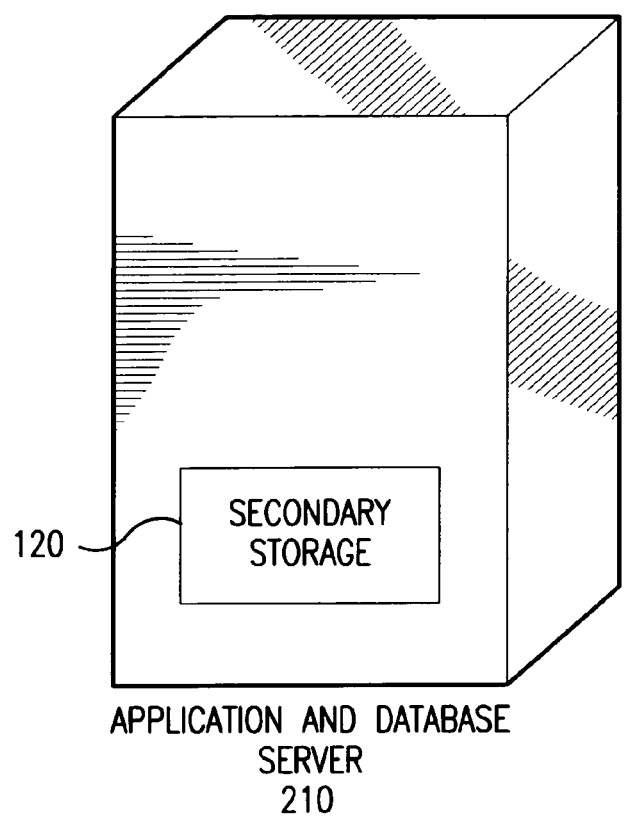
FIG. 2 shows a system according to an embodiment of the present invention.

FIG. 2 illustrates a system 200 according to an embodiment of the present invention. The system 200 is an example hardware implementation of the schema 100 of FIG. 1.

The system 200 includes an application and database server 210. The server 210 includes the secondary storage 120, and may provide a platform for the application program 130, the operating system 140, and the fault handler 150 (not shown) of the schema 100 in FIG. 1. It is to be appreciated that the system 200 may be implemented on one or multiple computers and/or storage devices.

In an embodiment, the system 200 runs on Sun UltraSPARC or Fujitsu computer systems running Solaris 8 or 9. In general, embodiments herein may be implemented on computer hardware/software systems that support virtual memory, allow user programs to catch segmentation violations, and allow catching routines to restart a faulting application by retrying the instruction that caused the segmentation violation. For instance, embodiments may involve POSIX-compliant systems, such as all varieties of Linux systems, Apple's MacOS X, Sun's Solaris, and Microsoft NT, and its derivatives such as Windows 2000 and XP. In addition, the computer hardware of the system 200 may support 64-bit addressing, with at least 40 bits actually supported by the memory-mapping unit of that hardware. Accordingly, the system 200 may directly access 1 terabyte of data. The larger the number of bits actually supported by the memory-mapping unit, the greater the size of the supported database. Sun SPARC systems, for example, support a 44-bit memory mapping unit, which means that such systems can provide immediate access to 16 terabytes of data. In an example implementation, the computer I/O system of the system 200 can provide at least 3 megabytes/second of data transfer.

Returning to the schema 100 of FIG. 1, in an embodiment, data is stored in the data repository 160 in the form of interconnected C++ objects. The objects can be accessed directly by an executing C++ program (e.g., the application program 130) and used as if they were part of the program's local memory. All the stored objects are directly interconnected by memory pointers into one large matrix of information. Only rarely is information searched for as in the classic database model, since almost all information is already pre-linked in the patterns in which it will be used. Unlike relational databases, which may use redundant data tables to represent these pre-linkages, any given data object in the data repository 160 is stored only once. This greatly reduces the total amount of storage required, eliminates database internal consistency problems, and simplifies software development.

In an embodiment, each object in the data repository 160 has knowledge times (time stamps) associated therewith, indicating when the object was first entered in the database and when it became invalid. Data may become invalid when it is deleted (expired) or updated (superseded by a new variant). This temporal information allows the user to effectively move in time, permitting the reproduction of reports as they would have appeared at any time in the past. In an embodiment, each object has a header defining such knowledge times.

The application program 130 may attach to the in-memory data repository 160 and map that repository into the virtual memory space of the application program 130. It then accesses the repository objects as if all of them were part of its own memory. The repository objects need not be copied before being given to the application program 130 since they are protected from alteration by memory hardware. An unlimited number of copies of the application program 130 can attach to this shared memory simultaneously. Only one copy can write at any one instant.

Inside each object is a virtual function pointer that points to a shared memory area that holds the virtual function tables, including virtual functions associated with object types. This pointer technique allows a data repository object to work transparently for any application that touches it. When an application attaches to the data repository 160, a startup routine copies the virtual function table from the application to a specific address in this shared memory, based on an ObjectType field that is stored in each object. Each object in the data repository 160 had its virtual function pointer altered to point to this specific address when it was placed into the data repository 160. Accordingly, each object will now automatically find the correct virtual function definitions for the application that is using it, even if they have changed from the time when the object was originally placed in the knowledgebase.

Each object also may have a pointer to itself. This allows an object to be asked for its shared memory address, no matter if the object is already in shared memory or it is a local copy. The code need not worry about the actual residency of the object because it will always get a consistent answer.

Objects can be associated with each other by links. In an implementation, there are three types of linkages in the data repository 160. Y Nodes define the start of like types of objects; X Nodes connect to particular object instances; and Z Nodes are implicit in the objects themselves, pointing from one variant of an object to the next. (Y Nodes actually contain the first X Node as part of themselves. They are shown separately below to more clearly reveal the underlying paradigm.) Linkages may come in a number of variations: zero-or-once, once, once-or-many, zero-or-once-or-many. For example, in a portfolio management embodiment, a Buy can buy one and only one Investment. The link between a Buy and an Investment would therefore be of type "once". Linkage variation rules are enforced at the time that objects or links are placed into the data repository 160.

In another example, the Buy of a stock may be made in terms of US Dollars (USD). To represent this relationship, the Buy object is linked to the MediumOfExchange object USD by an X node. Each X node has its own KnowledgeBegin and KnowledgeEnd dates, as two objects that have independent existence can be linked to each other for a given period of time and then that linkage may be terminated. For example, BMW was originally traded in Deutsche Marks (DM), but is now traded in Euros (EU). The default trading currency linkage for BMW originally pointed to DM, but that X node link was expired and a new one was added pointing to EU.

In an embodiment, each object in the data repository 160 has a number of header fields that identify the object, its virtual functions, where it is stored, and how to detect if it has been corrupted. The header contains the following example fields:

| | |
|---|---|
| ObjectType | Identifies the class of this object. (A maximum of 65,000 object types may be supported.) |
| ObjectSync | A 16-bit pattern chosen by statistical analysis to be least likely to appear in a knowledgebase. Used to assist in identifying the start of objects if data corruption occurs. |
| SegmentId | Associates this object with a particular repository segment. The default value for this field is zero. |
| Vpointer | C++ creates this field, which is a pointer to the virtual function table. The data repository 160 rewrites this pointer, when the object is being stored, so that each class's objects always point to a specific shared memory address. This allows an object to be given directly to many applications. |
| TreeCursor | Points to a unique X node, which, in turn, points to the first object in a stack of temporal variations of the same object. |
| Roles | Set of 16, 2-bit, user-role masks determining which user roles can read, write, or delete this object. |
| HashKey | A 16-bit numerical value that provides fast go/no-go matching when looking through a pile of objects for one that matches a given primary key. |
| CheckSum | A 32-bit value that is initially computed when an object is placed in memory. If the object and its checksum begin to disagree, memory corruption has occurred. |
| ObjectId | A unique value assigned to this object. This field can be used to identify this object to external systems. |
| RefCounter | Number of other objects pointing to this object. |
| NextItem | Pointer to next temporal variant of this object. (Oldest first.) |
| ShmAddress | Pointer to this object's location in shared memory. |
| KnowledgeBeginDate | Date this object was placed in knowledgebase. |
| KnowledgeEndDate | Date this object was either deleted or replaced by a new variant. |

Figure 3:
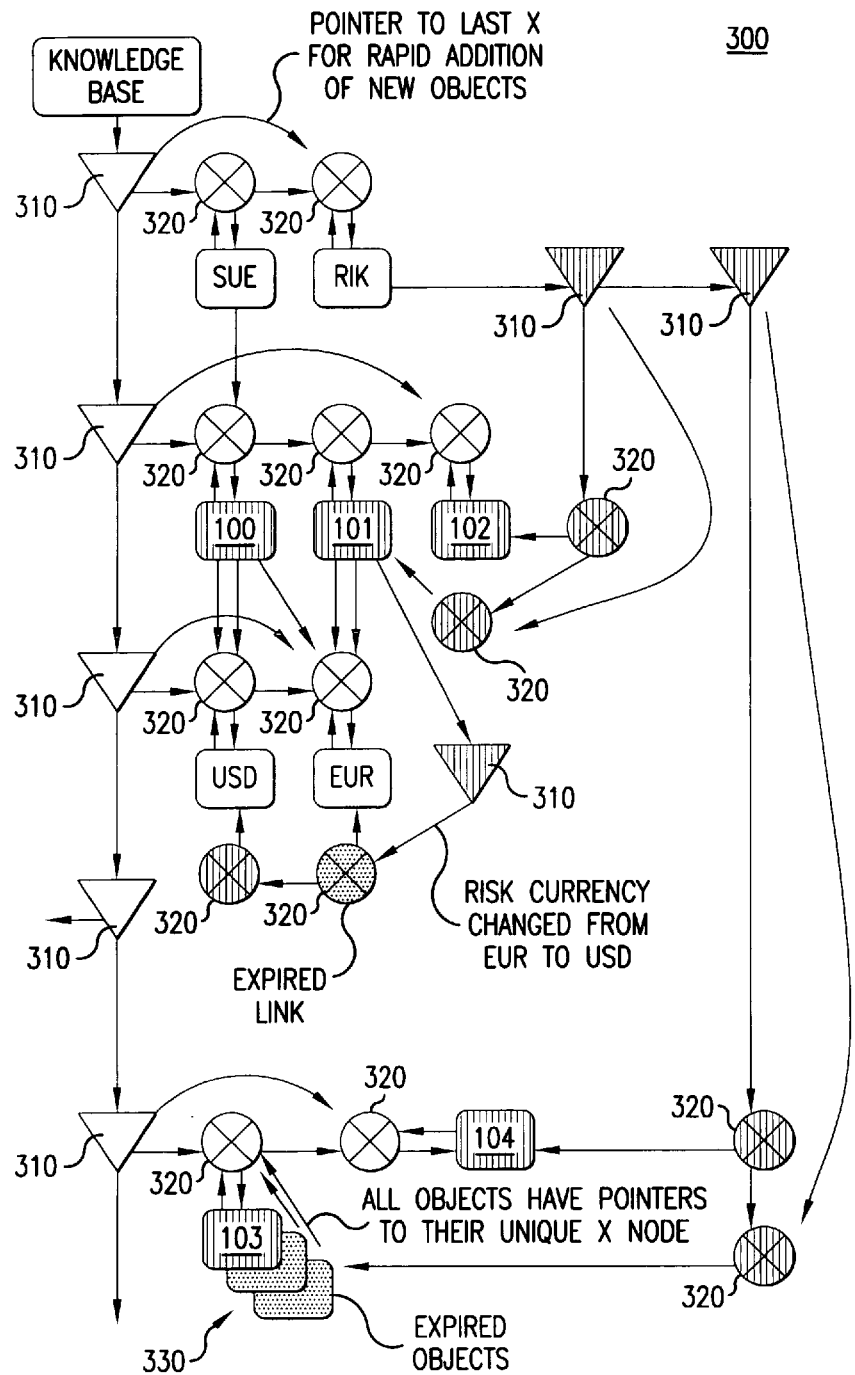
FIG. 3 shows a database structure according to an embodiment of the present invention.

FIG. 3 shows a database structure 300 according to an embodiment of the present invention. The structure 300 may represent how various different objects are linked together in the data repository 160 by the application program 130. The structure 300 is not comprehensive and is merely illustrative of an example structure in a portfolio management database.

Y Nodes 310 are shown as triangles, X Nodes 320 as circles with X's in them, and Z nodes 330 are represented by variants stacked vertically, such as Deposit 103. The gray objects are in specific Portfolio repository memory segments, and non-gray objects are in the default segments (described below).

Examples of types of inter- and intra-object pointers are shown in FIG. 3. Since all the objects are linked directly by memory pointers, an application such as the application program 130 can navigate from one data object to another at full memory speed. No "database" operations are required.

A single object may have dozens of linkages to other repository objects. In an embodiment, since these linkages would quickly come to dominate the storage space, objects that are linked "once" to another object, with no variations in the link, point to a special X Node, called a "unique" X Node. There is one "unique" X Node for each object linked to the main knowledgebase object. This may be especially valuable in an example investments setting which has six different pointers to a MediumOfExchange. All of these pointers are generally invariant, and all normally point to the same object. These pointers are PriceDenomination, BifurcationCurrency, RiskCurrency, IncomeCurrency, PrincipalCurrency, and PriceCrossingCurrency.

Figure 4:
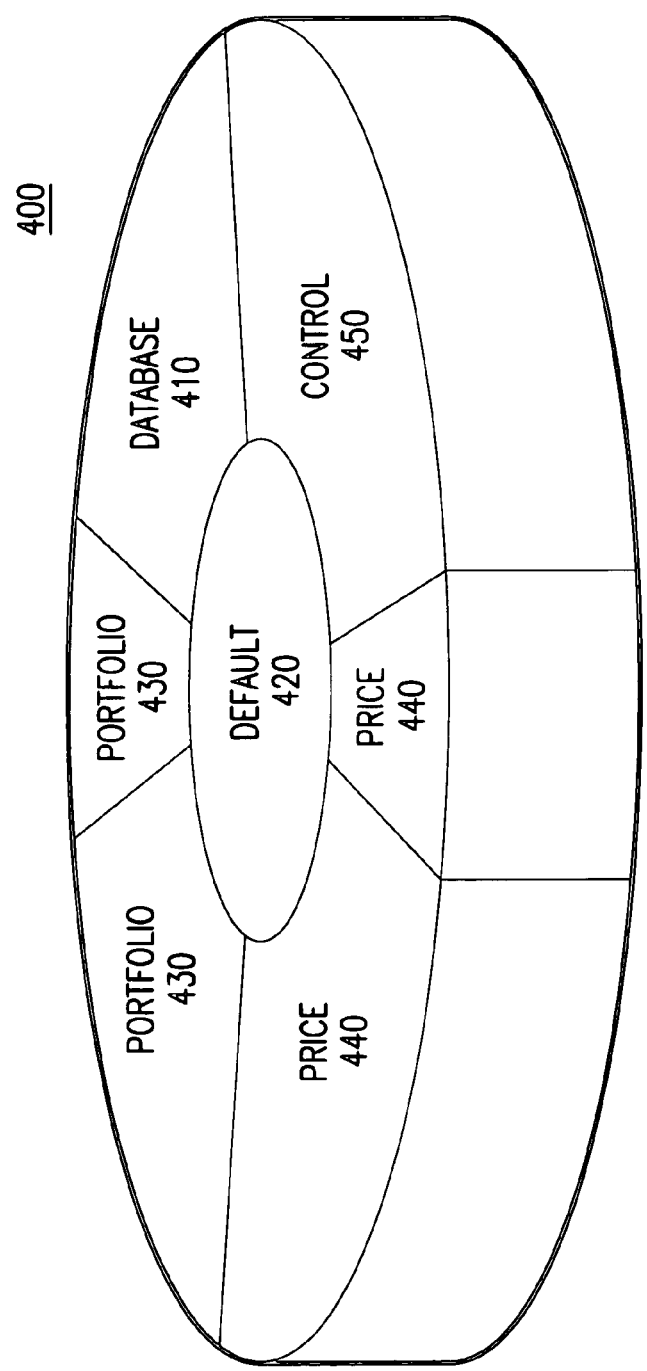
FIG. 4 shows a segmented data repository according to an embodiment of the present invention.

FIG. 4 shows a segmented data repository 400 according to an embodiment of the present invention. The data repository 400 is a logical representation, showing example kinds of data segments in a portfolio management application.

In an example embodiment, there are five types of data segments in the data repository 400: database, default (or core), portfolio, price, and control. The database segment 410 holds those objects that define the database. This segment includes the database logfile write buffer, the current database status, and Segment and SegmentFile objects that point to all the other segments in the data repository 400.

The price segments 440 contain all non-MediumOfExchange PriceDay objects as well as links to them. Each price segment 440 represents one month of prices for all investments in the associated portfolio management application.

The price segments 440 appear as files to the system, with names containing the year and month in human-readable format.

The portfolio segments 430 hold all the transactions for individual portfolios as well as the links pointing to them, all objects owned by them, and all links pointing to those owned objects. (For example, Reorganization transactions own ReorganizationElements. These ReorganizationElements and the links to their Reorganization parents are all in the same segment as the Reorganization that owns them.) In an embodiment, if the objects are linked to the main knowledgebase object, those links are not placed in the portfolio segments. The Portfolio objects themselves are also not placed in the segments so that they can be searched without paging through the portfolio segments.

The control segment 450 stores all the UserSession and Agent objects that track usage of the knowledgebase. There is only one control segment 450, just as there is only one database segment 410.

The default (or core) segment 420 holds everything that is not placed in any other segment. In an embodiment, the default segment 420 holds about 10–20% of the data.

In an embodiment, a hash table (not shown) resides in the default segment 420. This table allows rapid object access given either primary or secondary keys. Not all object types have entries in this table. Only those that potentially are numerous and might be searched for by key are indexed here. For example, users may look for a particular PortfolioEvent by using a secondary key that they have provided. This table will immediately locate the matching event. The table also may be used to ensure that all primary and secondary keys are unique when a new object is entered into the knowledgebase.

In an embodiment, objects stored in the memory-mapped file segments of the data repository 160 (FIG. 1) or 400 (FIG. 4) are divided into groups, called species. Example species include Prices, PortfolioEvents, control objects (Agents, UserSessions), derived numerical results (such as Time Weighted Return (TWR) values), and core objects (everything else. An individual segment only contains objects of a particular single species. While the species define the segmentation scheme, an individual within a species may be referred to as a specimen. For example, each Portfolio constitutes a specimen of the PortfolioEvent species. Each PriceMonth constitutes a specimen of the Price species.

In a particular embodiment, memory-mapped file segments range from 1 to 16 megabytes in size. Segments may grow automatically from minimum to maximum size as objects are added to them, overflowing into new segments if 16 megabytes is insufficient.

In an embodiment, a user-specified maximum number of segments from each species are held in memory. These segments are evicted from memory on a least-recently-used (LRU) basis. Segments are placed in memory whenever objects that they contain are referenced by the application program 130. The system may run with as little as one segment from any species in memory. As such, a user has essentially total freedom in defining the number of segments that may be concurrently mapped at any one moment.

In an embodiment, to support the splitting of a data repository into segments, object insertion routines test virtual functions that specify how each object type is to be handled during insert. For example, Portfolio-related events may be stored in clusters that are mapped together in memory based on their associated Portfolio.

In an example implementation, when a portfolio is added to the data repository, it is assigned a 16-megabyte address at which to start storing its events. This address is a direct function of the segment identifier that is placed in the Portfolio object. All events associated with this Portfolio will be placed in this allocated memory. Assuming a 44-bit virtual address space, such as provided by SPARC CPUs, more than 1,000,000 Portfolios are supported, each holding about 40,000 events. It is to be understood that reducing the 16-megabyte default size for a segment increases the maximum number of Portfolios that can be supported. In a setting that hosts tens of millions of small, relatively inactive Portfolios, such a reduction may be particularly valuable.

If the 16 megabyte area reserved for the Portfolio is filled, a new, not necessarily contiguous, allocation is created, and filling of the allocated space resumes. In this way, there is no limit to the size of the stored Portfolio. Segment memory is not completely zeroed when it is allocated; thus, no page faults occur in the unused memory.

In an embodiment, a segment address allocation algorithm may involve a highest segment address. The highest segment address may be stored in a database object as a reference. When a new segment is required, it is allocated from this address, and the address is then incremented by 16 megabytes.

When an application process attempts to access memory associated with a Portfolio, memory that is not already mapped will cause a segmentation violation (SIGSEGV). The fault handler then determines if this is a true memory access error or just a request for a segment that is not yet in memory. If the SIGSEGV results from a segment request, the handler memory-maps the segment and restarts the operation.

In an embodiment, although memory space is allocated in 16-megabyte segments, the underlying mapped files may be created and extended in smaller segments, such as 1-megabyte segments. Such a partial allocation approach may greatly lessen the physical disk space needed to store thousands of small Portfolios and reduces backup and file transfer times.

Processes detach the segments that they are no longer using. A maximum memory usage may be enforced where segments are unmapped in a least-recently-used (LRU) manner whenever a user-specified limit is reached. In a portfolio management embodiment, only a few months of prices may need to be mapped into memory at any given time.

In an example implementation, the data repository 160 or 400 holding mapped data segments is stored on a disk subsystem that is connected to a NFS (Network File System) or similar network. Accordingly, the mapped files of the data repository are accessible via NFS from multiple remote computers simultaneously. As such, users who have numerous small computers can team the computers to satisfy large batch processing requirements. Such remote processing is further facilitated by the fact that the network need only transport those data segments that are needed by the remote computers. Such an implementation is scalable, enabling databases to grow extremely large, not limited by hardware memory constraints and associated cost factors.

It is to be appreciated that, because users can leverage existing networks of computers to accelerate batch runs, TCO (Total Cost of Ownership) is lowered, and batch cycle completion times are improved. In addition, troubleshooting of database problems may be performed more rapidly and responsively, as less data needs to be transferred, and tests may be performed using smaller, more readily available computers.

Figure 5:
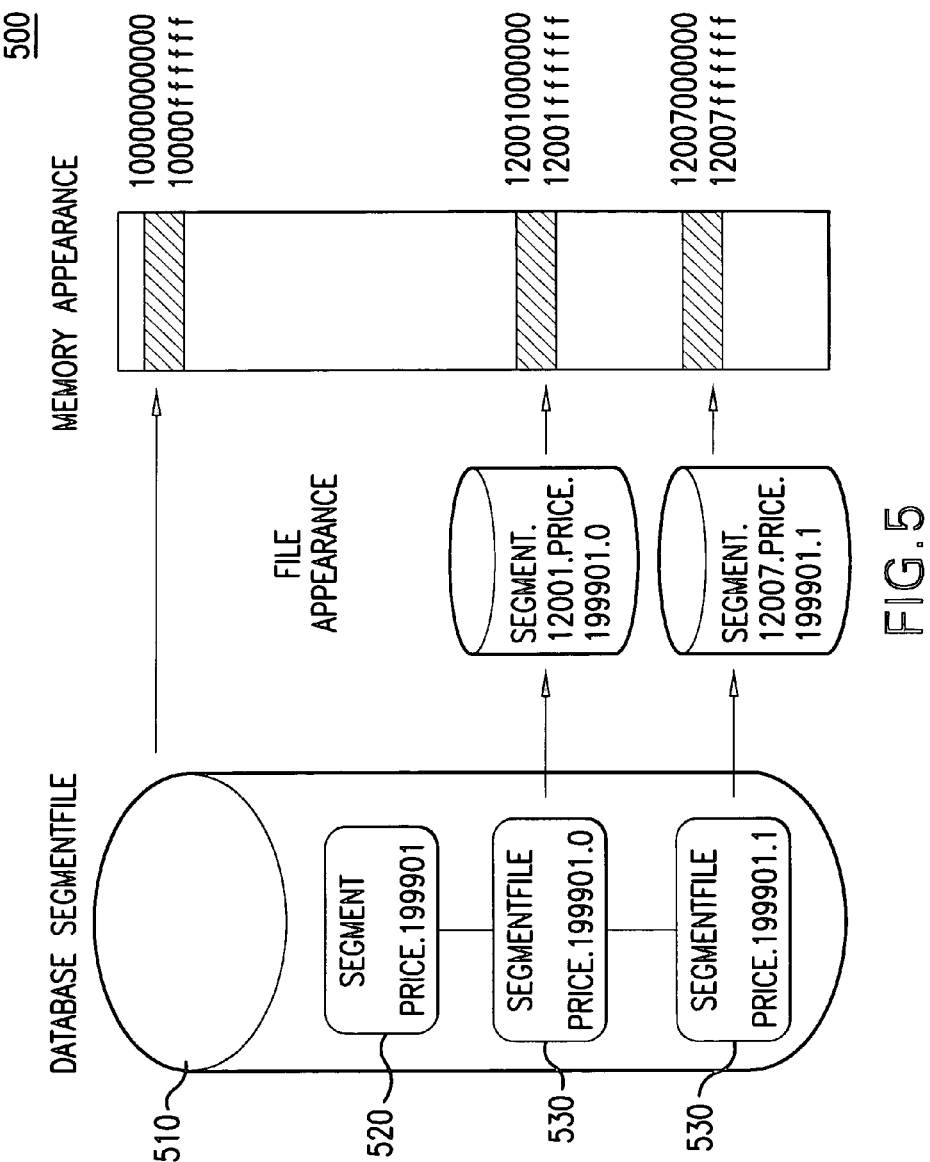
FIG. 5 shows a representation of memory-mapped segment files according to an embodiment of the present invention.

FIG. 5 shows a representation 500 of memory-mapped segment files according to an embodiment of the present invention.

In an embodiment, segment files are named such that they can be quickly located and mapped back into main memory when a corresponding object referenced by an application leads to a segmentation fault. In particular, the names of segment files may relate to the address of the corresponding object that leads to the segmentation fault.

In an embodiment, the organization of data into memory-mapped segment files is influenced by a consideration of a logical view of the data, such as interrelationships among data. For instance, related data may be clustered together. Accordingly, the amount of data that needs to be mapped into main memory at any one moment may be greatly reduced. In addition, the application program may run faster because cache hit rates may be improved, and TLB (translation lookaside buffer) misses minimized. Further, segment files can be dropped to purge data from the data repository when necessary or desired.

Since segment files are used to store data, there may be potentially a large number of files stored in segment directories. In an implementation, these files are protected and stored on a device that provides adequate data velocity and capacity. The embodiments herein reduce the amount of swap disk space required to run an application program. This reduction occurs since a multiprocessing operating system must reserve disk swap space equal to the size of the programs kept in process memory. It must reserve this space so that it can move the task out of main memory and onto its swap disk if a higher priority program needs to run. The embodiments herein reduce the amount of swap space that is required, as most of the data is not mapped into memory at any given moment, and that which is mapped into memory is mirrored by the disk files themselves. This means that the operating system does not need to reserve swap disk space for this data, whether it is mapped into memory or not.

In a particular embodiment, a segment, such as a segment for a Portfolio, may be stored in a Segment Library, which has a two-level directory structure. Two ASCII-formatted, hexadecimal digit sequences, representing a portion of the segment's memory address, create file and directory names. The file name also contains the name of the Portfolio for human accessibility. For example, if a report starts processing the PortfolioEvents for Portfolio Fred, and Fred's events have not previously been used, a memory fault might occur at (hexadecimal) address 0x11234567890. The fault handler for the data repository would then attempt to open the segment directory segment.4635.112, looking for a filename matching the pattern segment.4635.11234.*. The file segment.4635.11234.portfolio.fred.0 will match this pattern, and the fault handler will then map this file at address 0x11234000000 for 16-megabytes. If present, this file is attached and the process is restarted.

If a very large Portfolio requires more than one segment, its subsequent segments will have ascending final digits; for example, Fred's Portfolio might have files segment. 4635.11234.portfolio.fred.0, segment.4635.112f5.portfolio. fred.1, and segment.4635.1134a.portfolio.fred.2. (Segment addresses start at virtual address 0x10000000000, which is 1 terabyte.) It is to be noted that no central lookup table is necessary because the address provides all information that is needed.

The above naming convention may enable support of multiple data repositories stored in the same directory, as well as access to 15 terabytes out of the 16-terabyte virtual address space. Further, an administrator can easily locate the files belonging to a particular data repository or portion thereof.

In an example implementation, segmentation also may be employed to store prices. Each PriceMonth, in a main database, points to its child PriceDays, which are stored in their matching segments. When a segmentation violation occurs, the segment is loaded into memory, and processing is resumed. Such operations are transparent from the perspective of the application program.

Price segments may have names of the form segment.4635.10008.price.200111.0, where 4635 is the hexadecimal data repository name, 10008 indicates that this page maps at address 0x10008000000, price shows that this is a price segment, 200111 indicates that this is a price segment for November, 2001, and 0 indicates that this is the first segment in what might be a chain of segments for this month.

It is to be appreciated that analogous naming conventions and organizational techniques to those above may be employed in contexts other than portfolio management applications.

FIG. 5 shows example linkages of the stored database objects and the segmentfiles that hold the data that is memory-mapped when referenced. Three segmentfiles are shown. The first is the Database segmentfile 510, which contains the segment 520 and segmentfile 530 objects. The segmentfile 530 objects are normal object segmentfiles. In the example of FIG. 5, they both contain investment price objects for January 1999. The segmentfile names are automatically generated from the keys of the objects being stored and the memory ranges that the data repository routines allocate for them. A segmentfile starts at 1 megabyte in size and can be extended to a maximum of 16 megabytes. If more space is needed, a new segmentfile is created. In various embodiments, a segment may own many non-contiguous segment files.

Figure 6:
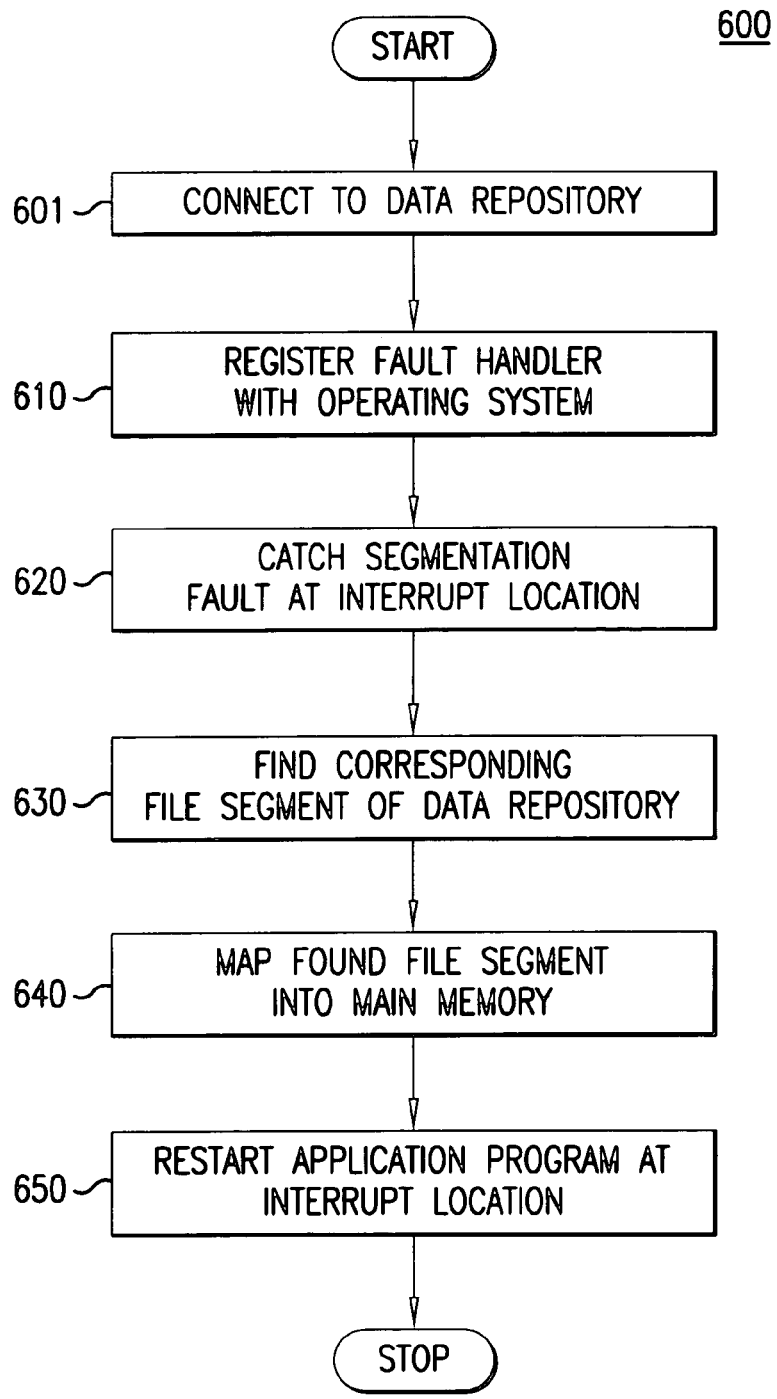
FIG. 6 shows a process according to an embodiment of the present invention.

FIG. 6 shows a process 600 according to an embodiment of the present invention. The process 600 may be used for memory mapping of databases consistent with the schema 100 of FIG. 1, as well as with other embodiments herein, such as shown in FIGS. 2–5.

In task 601, an application program connects to a data repository of a database. The data repository includes a plurality of memory-mapped file segments stored on at least one nonvolatile memory medium.

In task 610, a fault handler for the data repository is registered with the operating system on which the application program runs. In task 620, the fault handler catches a segmentation fault issued for a data repository object that is referenced by the application program but not currently mapped into main memory. The segmentation fault is issued at an interrupt location in the application program.

In task 630, a file segment of the data repository corresponding to the referenced object is found. In task 640, the found file segment is mapped into main memory. In task 650, the application program is restarted at the interrupt location at which the segmentation fault was issued.

Figure 7A:
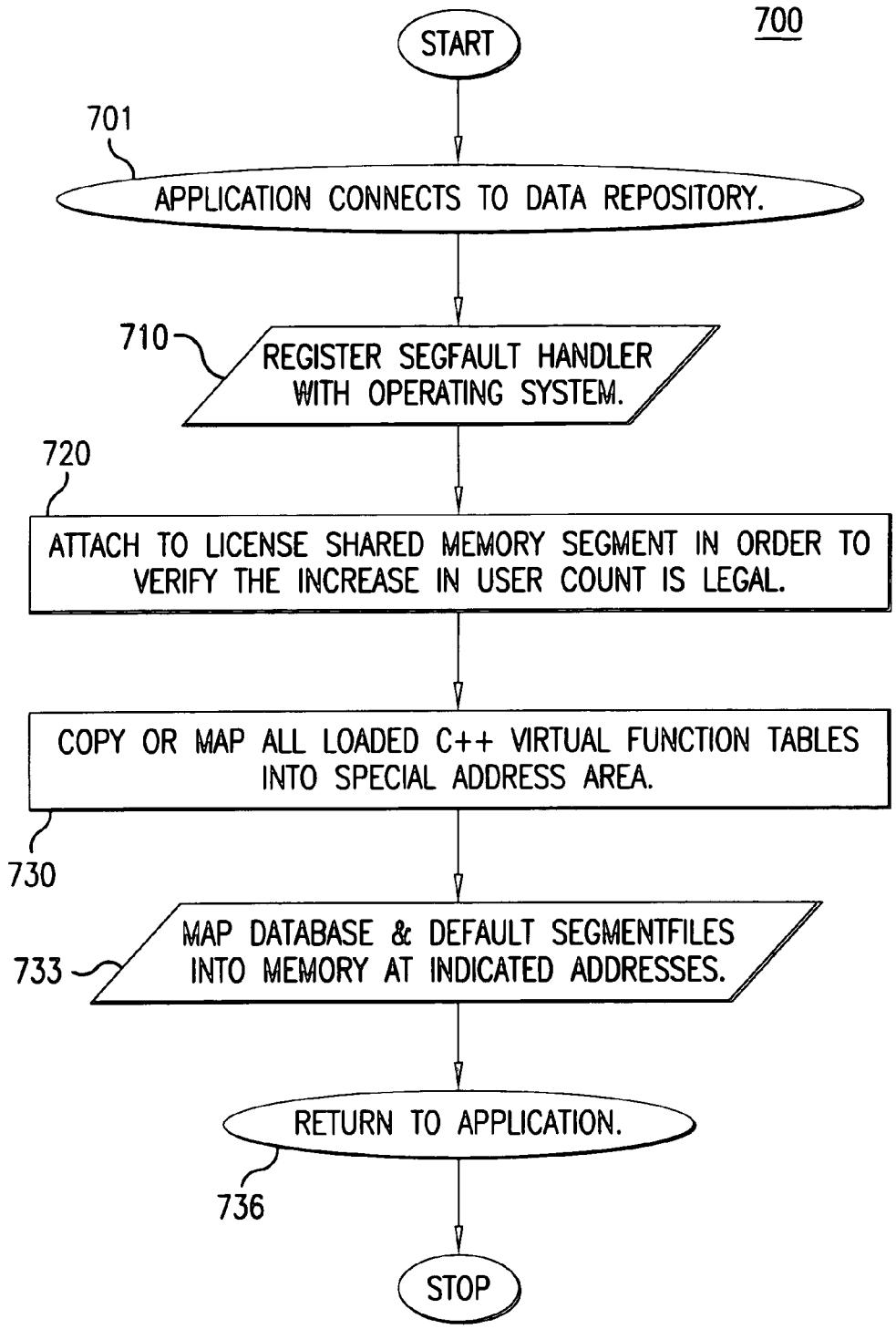
FIG. 7A shows a process according to an embodiment of the present invention.
Figure 7B:
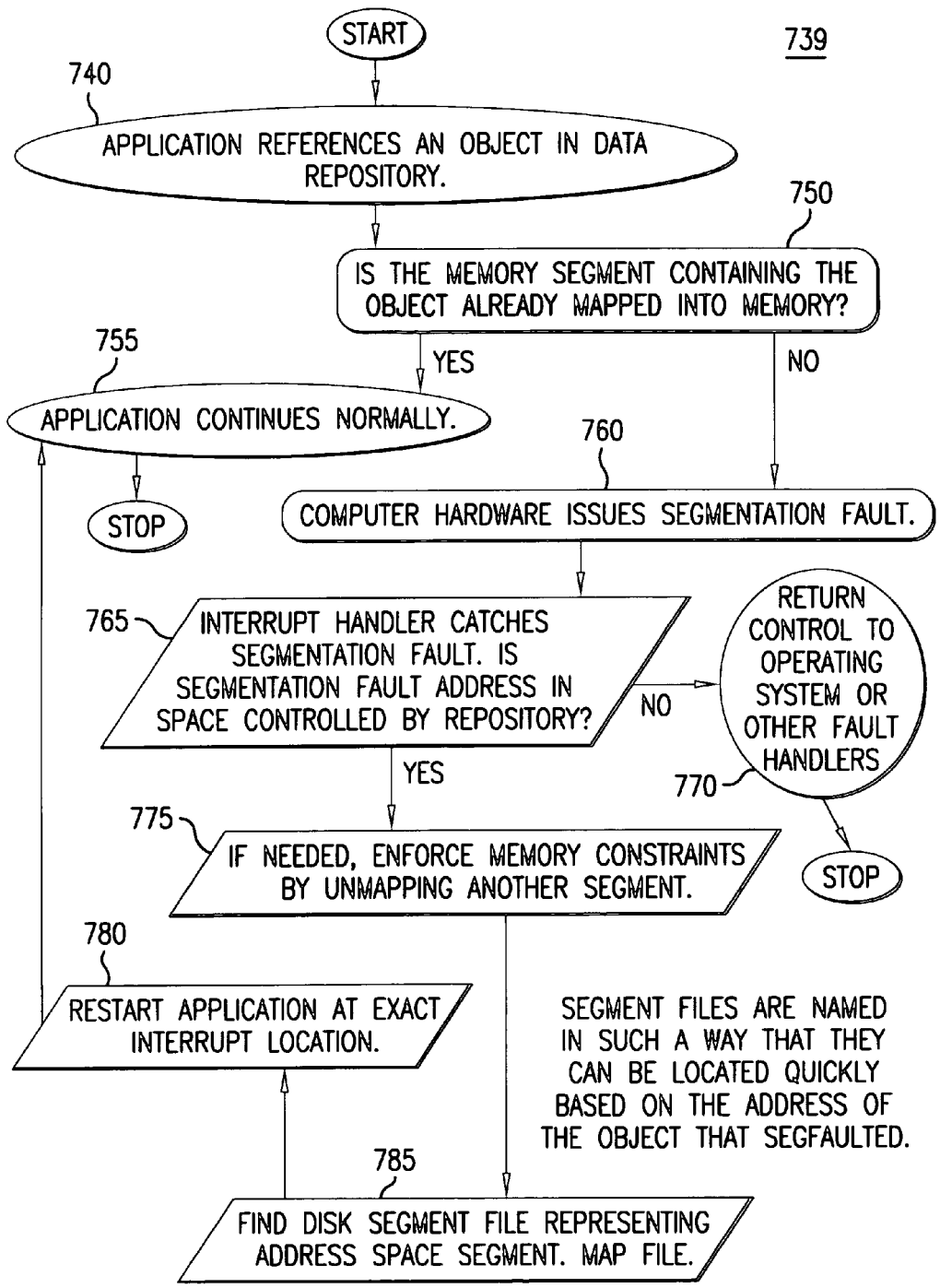
FIG. 7B shows a process according to an embodiment of the present invention.

FIGS. 7A and 7B show processes 700, 739 according to embodiments of the present inventions. The processes 700, 739 are similar to the process 600 in some respects. The ellipses in the processes 700, 739 show interfaces to outside routines, such as application program(s). Rounded rectangles show computer hardware actions.

In task 701 of FIG. 7A, an application connects to the data repository. In task 710, the repository interrupt handler (SEGFAULT) is registered with the operating system. This interrupt handler is able to catch segmentation faults issued by computer hardware during the course of execution of an application.

In task 720, the application attaches to a license shared memory segment. This task is used to verify that the increase in user count is legal. Task 720 need not be performed in certain embodiments.

In task 730, all loaded C++ virtual functions are copied or mapped into a special address area.

In task 733, database and default segment files are mapped into memory at the addresses indicated by their names. For example, the database segment file that is named segment.10000.database.1.0 is mapped into memory starting at location 0x10000000000. Similarly, the first default segment, segment.1000.default.1.0, would be mapped starting at location 0x10001000000. This mapping is done using the same address mapping methodology depicted in FIG. 5.

In task 736, control is returned to the application.

Turning to task 740 of FIG. 7B, the application references an object in the data repository. The memory segment for that object may or may not be already mapped into main memory. Task 750 determines which is the case. If the segment is already mapped into main memory, then in task 755, the application continues normally.

If the segment is not already mapped, then the computer hardware issues a segmentation fault (task 760).

In task 765, the interrupt handler catches the segmentation fault. It is determined whether the segmentation fault address is in the space controlled by the data repository. If not, then control is returned to the operating system or other fault handlers (task 770).

If the fault address is in that space, then, if needed, memory constraints are enforced by unmapping another segment (task 775). The disk segment file that represents the address space segment is found, and the file is mapped to main memory (task 785). As mentioned above, segment files may be named in such a way that they can be located quickly based on the address of an object that led to a segmentation fault.

In task 780, the application is restarted at the exact interrupt location associated with the segmentation fault.

Figure 8:
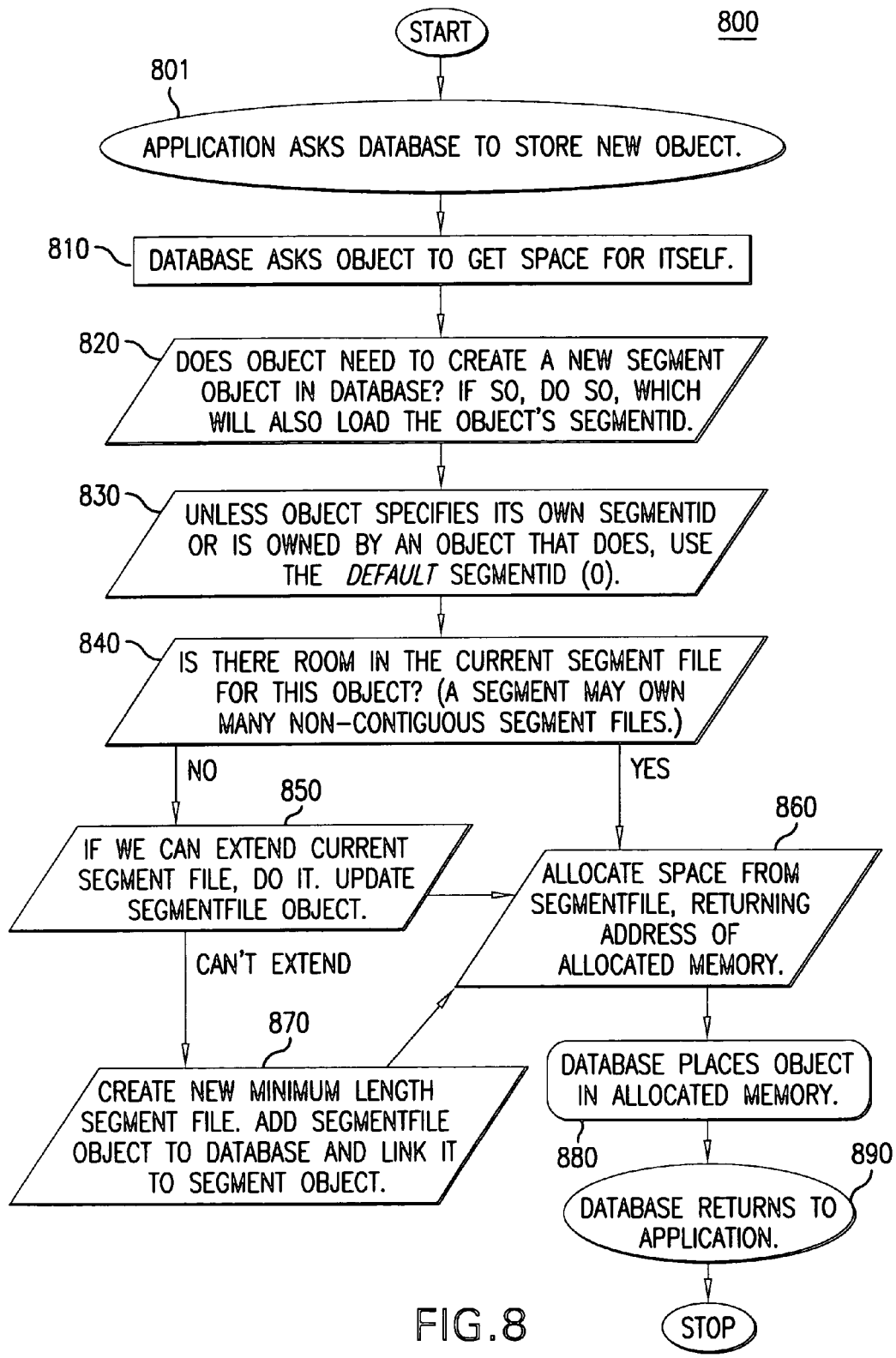
FIG. 8 shows a process according to an embodiment of the present invention.

FIG. 8 shows a process 800 according to an embodiment of the present invention. The process 800 may be applied when new objects need to be stored in the data repository.

In task 801, an application desiring to add an object to the database calls either an insert or update subroutine as defined by the database API (Application Program Interface). By calling this appropriate subroutine, control is passed to the database routines (task 810), which attempt to perform the corresponding operation and return their success or failure back to the application (task 890).

In task 820, if the object needs to create a new segment object in the database, the segment object is created, which also loads the object's segmentID. A new segment object, with its new corresponding segmentID, is required if the object being stored is the first instance of a new species member. For example, in an embodiment, suppose a new Portfolio, Jean, is added to the database. When the first trade for Portfolio Jean, a Buy for example, must be inserted, there is no place to put this Buy until a segmentfile is created with a corresponding name and a new segment object to point to it. If the segment object already exists, it will have been retrieved as part of the test performed in task 820 and, as such, the stored object's appropriate segmentID will be known.

Unless the object specifies its own segmentID or is owned by an object that does, the default segmentID(0) is used (task 830). In task 840, the process determines whether there is space for this object in the current segment file. If so, then space is allocated from the segmentfile, and the address of allocated memory is returned (task 860). If not, the current segment file is extended if possible, and the segment file object is updated (task 850). Otherwise, a new minimum length segment file is created, the segment file object is added to the database, and the segment file object is linked to the segment object (task 870).

In task 880, the database places the object in the allocated memory. The database returns to the application in task 890.

Consistent with the above teachings, various example implementations may be realized. In one implementation, support is provided for a 15 terabyte data repository, with up to one million portfolios, using minimal amounts of RAM. Checkpoints lock the entire data repository and perform full file system copies from working to checkpoint directories. There is only one writer for all of the data repository. Multiple-computer support is minimal. Fail-over from one computer to another is not supported.

In another implementation, the file system copy described above is performed in an unlocked mode, which eliminates checkpoint locking issues. Time stamps at the beginning and end of the file copies allow for backstitching of the log file in such a way that changes are reversed that occurred after the start of the checkpoint. Each file has a header object that records the beginning and ending time of the copy.

In another implementation, which addresses locking issues, one writer is provided for the control species, and one for all other species. This change relieves conflict between heavy users, such as the loader in all-or-none mode, and users attempting to log onto the system. Because the control species is locked independently of the others, users can log in while the loader is running; they only need to write to the control species, and the loader never writes to that species. All other transactions gain a lock on all objects except for the control species. Agent and UserSession objects are always written to the control species and are never rolled back. Simultaneous writing is simplified, as the control lock is not held during the entire extent of the lock on all other species.

Another implementation supports failover or automatic switching from one data repository mother computer to another. This feature provides a user uninterrupted operation when maintenance is required on the normal host computer. Msyncing of memory and baton passing occur between two data repository mother computers. Integrity checking is performed in order to recover information that may not have been fully applied because of a crash of an original host computer that necessitates the switching.

In yet another implementation, one writing and multiple reading computers operate simultaneously. An existing computer farm may be employed to expedite processing during batch cycles by dividing the work across the machines in the farm.

The foregoing description of the various embodiments of the present invention is provided to enable any person skilled in the art to make and use the present invention and its embodiments. Various modifications to these embodiments are possible, and the generic principles presented herein may be applied to other embodiments as well.

For instance, an existing in-memory database may be converted to a memory-mapped database consistent with embodiments of the present invention. Such a conversion may include the provision of secondary storage for a data repository and the programming of modules, such as a fault handler for the data repository.

It will be apparent to one of ordinary skill in the art that some of the embodiments as described hereinabove may be implemented in many different embodiments of software, firmware, and hardware in the entities illustrated in the figures. The actual software code or specialized control hardware used to implement some of the present embodiments is not limiting of the present invention.

Moreover, the processes associated with some of the present embodiments may be executed by programmable equipment, such as computers. Software that may cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable medium at a later date. Such a medium may include any of the forms listed above with respect to storage devices.

A "computer" or "computer system" may be, for example, a wireless or wireline variety of a microcomputer, minicomputer, laptop, personal data assistant (PDA), wireless e-mail device (e.g., BlackBerry), cellular phone, pager, processor, or any other programmable device, which devices may be capable of configuration for transmitting and receiving data over a network. Computer devices disclosed herein can include data buses, as well as memory for storing certain software applications used in obtaining, processing and communicating data. It can be appreciated that such memory can be internal or external. The memory can also include any means for storing software, including a hard disk, an optical disk, floppy disk, ROM (read only memory), RAM (random access memory), PROM (programmable ROM), EEPROM (electrically erasable PROM), and other computer-readable media.

What is claimed is:

1. A method for an application program to access an object-oriented database (OODB), the application program being one of a portfolio management application and a trade order management system (TOMS) application, the application program being associated with an operating system, the method comprising:
    (a) connecting to a data repository of the database, the data repository including a plurality of memory-mapped file segments stored on at least one nonvolatile memory medium, wherein the database is not stored in a main memory of a computer connecting to the data repository, the file segments including objects directly interconnected by memory pointers, wherein each object has an associated stored time stamp, the time stamp indicating at least one of a time when the object first appeared in the data repository and a time when the object became invalid, wherein the data in the data repository is not copied into main memory from the data repository when needed by the application program, and wherein the database is one of a portfolio management database and a TOMS database;
    (b) registering a fault handler with the operating system, the fault handler associated with the data repository;
    (c) catching, by the fault handler, a segmentation fault issued for an object referenced by the application program and resident in the data repository, the segmentation fault issued at an interrupt location in the application program;
    (d) finding a file segment of the data repository that corresponds to the referenced object;
    (e) mapping the found file segment into the main memory; and
    (f) restarting the application program at the interrupt location.

2. The method of claim 1, wherein the file segments include at least one portfolio segment and price segment.

3. A method for an application program to manage memory associated with an object-oriented database (OODB) accessed by the application program, the application program associated with an operating system, the method comprising:
    (a) connecting to a data repository of the database, the data repository including a plurality of memory-mapped file segments stored on at least one nonvolatile memory medium, wherein the database is not stored in a main memory of a computer connecting to the data repository;
    (b) registering a fault handler with the operating system, the fault handler associated with the data repository;
    (c) catching, by the fault handler, a segmentation fault issued for an object referenced by the application program and resident in the data repository, the segmentation fault issued at an interrupt location in the application program;
    (d) finding a file segment of the data repository that corresponds to the referenced object;
    (e) mapping the found file segment into the main memory; and
    (f) restarting the application program at the interrupt location,
    wherein file segments in the data repository are not copied into the main memory from the data repository when needed by the application program and are instead read, updated, deleted or modified directly in the data repository by the application program.

4. The method of claim 3, further comprising unmapping a second file segment from the main memory before mapping the found file segment.

5. The method of claim 4, wherein file segments are unmapped according to a least-recently-used (LRU) criterion.

6. The method of claim 3, wherein the nonvolatile memory medium is a disk.

7. The method of claim 3, wherein objects in the data repository are directly interconnected by memory pointers.

8. The method of claim 7, wherein the objects comprise C++ objects.

9. The method of claim 7, wherein a linkage in the interconnected objects includes at least one of an X node, a Y node, and a Z node.

10. The method of claim 3, wherein each object includes a virtual function pointer, the pointer pointing to a shared memory area holding virtual function tables associated with object types.

11. The method of claim 3, wherein every object in a class of the data repository points to a same predetermined shared memory address when stored.

12. The method of claim 3, wherein each object includes a pointer to itself.

13. The method of claim 3, wherein each object in the data repository has an associated stored time stamp, the time stamp indicating at least one of a time when the object first appeared in the data repository and a time when the object became invalid.

14. The method of claim 13, wherein the time stamp is stored in a header of the object.

15. The method of claim 3, wherein the application program is a portfolio management application, and the database is a portfolio management database.

16. The method of claim 15, wherein the file segments include at least one portfolio segment and price segment.

17. The method of claim 3, further comprising:
    (a) upon a request by the application program to store a new object in the database, creating a segment object in the data repository;
    (b) associating a segment identifier with the new object, the segment identifier being one of a default segment identifier, a segment identifier specified by the new object, and a segment identifier specified by another object that owns the new object;
    (c) if a current segment file has sufficient memory for the new object, allocating memory to the new object from the current segment file;
    (d) if the current segment file has insufficient space for the new object, allocating memory to the new object by extending the current segment file or creating a new segment file; and
    (e) storing the new object in the allocated memory.

18. The method of claim 17, wherein memory is allocated in 16 megabyte segments.

19. The method of claim 17, wherein segment files are extended or created in 1 megabyte segments.

20. The method of claim 3, wherein the data repository is connected to a NFS (Network File System) network.

21. The method of claim 20, wherein multiple computers access the data repository via the NFS network.

22. The method of claim 3, wherein the data repository resides in multiple computers.

23. The method of claim 3, wherein the found file segment is stored in a segment library having a two-level directory structure.

24. The method of claim 23, wherein a file name of the found file segment includes a hexadecimal digit sequence representative of a portion of a memory address of the found file segment.

25. The method of claim 23, wherein a directory name of a directory containing the found file segment includes a hexadecimal digit sequence representative of a portion of a memory address of the found file segment.

26. The method of claim 3, wherein checkpoints lock at least a portion of the data repository during a file system copy.

27. The method of claim 26, wherein at least one species of objects of the file segments is locked independently of another species of objects of the file segments.

28. The method of claim 3, wherein the application program and database are associated with a trade order management system (TOMS).

29. A system for an application program to manage memory associated with an object-oriented database (OODB) accessed by the application program, the application program associated with an operating system, the system for an application program to manage memory comprising:
    (a) means for connecting to a data repository of the database, the data repository including a plurality of memory-mapped file segments stored on at least one nonvolatile memory medium, wherein the database is not stored in a main memory of a computer connecting to the data repository;
    (b) means for registering a fault handler with the operating system, the fault handler associated with the data repository;
    (c) means for catching, by the fault handler, a segmentation fault issued for an object referenced by the application program and resident in the data repository, the segmentation fault issued at an interrupt location in the application program;
    (d) means for finding a file segment of the data repository that corresponds to the referenced object;
    (e) means for mapping the found file segment into the main memory; and
    (f) means for restarting the application program at the interrupt location,
    wherein file segments in the data repository are not copied into the main memory from the data repository when needed by the application program and are instead read, updated, deleted or modified directly in the data repository by the application program.

30. The system of claim 29, wherein the application program is a portfolio management application, and the database is a portfolio management database.

31. An object-oriented database (OODB), comprising:
    (a) a data repository including a plurality of memory-mapped file segments stored on at least one nonvolatile memory medium;
    (b) the file segments including objects directly interconnected by memory pointers;
    (c) each object having an associated stored time stamp, the time stamp indicating at least one of a time when the object first appeared in the data repository and a time when the object became invalid; and
    (d) the data in the data repository not being copied into a main memory of a computer accessing the data,
    wherein the database is not stored in the main memory,
    wherein the data repository has an associated fault handler, the fault handler registered by an application program with an operating system associated with the application program,
    wherein the fault handler is configured to catch a segmentation fault issued for an object referenced by the application program and resident in the data repository, the segmentation fault issued at an interrupt location in the application program,
    wherein a file segment of the data repository that corresponds to the referenced object is mapped into the main memory, and
    wherein the application program is restarted at the interrupt location.

32. The database of claim 31, wherein the application program is a portfolio management application, and the data repository is a portfolio management data repository.

33. A machine-readable medium encoded with a plurality of processor-executable instructions for:
    (a) connecting to a data repository of an object-oriented database (OODB) accessed by an application program, the application program associated with an operating system, the data repository including a plurality of memory-mapped file segments stored on at least one nonvolatile memory medium, wherein the database is not stored in a main memory of a computer connecting to the data repository;

(b) registering a fault handler with the operating system, the fault handler associated with the data repository;

(c) catching, by the fault handler, a segmentation fault issued for an object referenced by the application program and resident in the data repository, the segmentation fault issued at an interrupt location in the application program;

(d) finding a file segment of the data repository that corresponds to the referenced object;

(e) mapping the found file segment into the main memory; and (f) restarting the application program at the interrupt location, wherein file segments in the data repository are not copied into the main memory from the data repository when needed by the application program and are instead read, updated, deleted or modified directly in the data repository by the application program.

34. The machine-readable medium of claim 33, wherein each object in the data repository has an associated stored time stamp, the time stamp indicating at least one of a time when the object first appeared in the data repository and a time when the object became invalid.

\* \* \* \* \*